Feb. 10, 1970   J. D. STATES   3,494,664
LATCH FOR SAFETY BELTS
Filed March 8, 1968
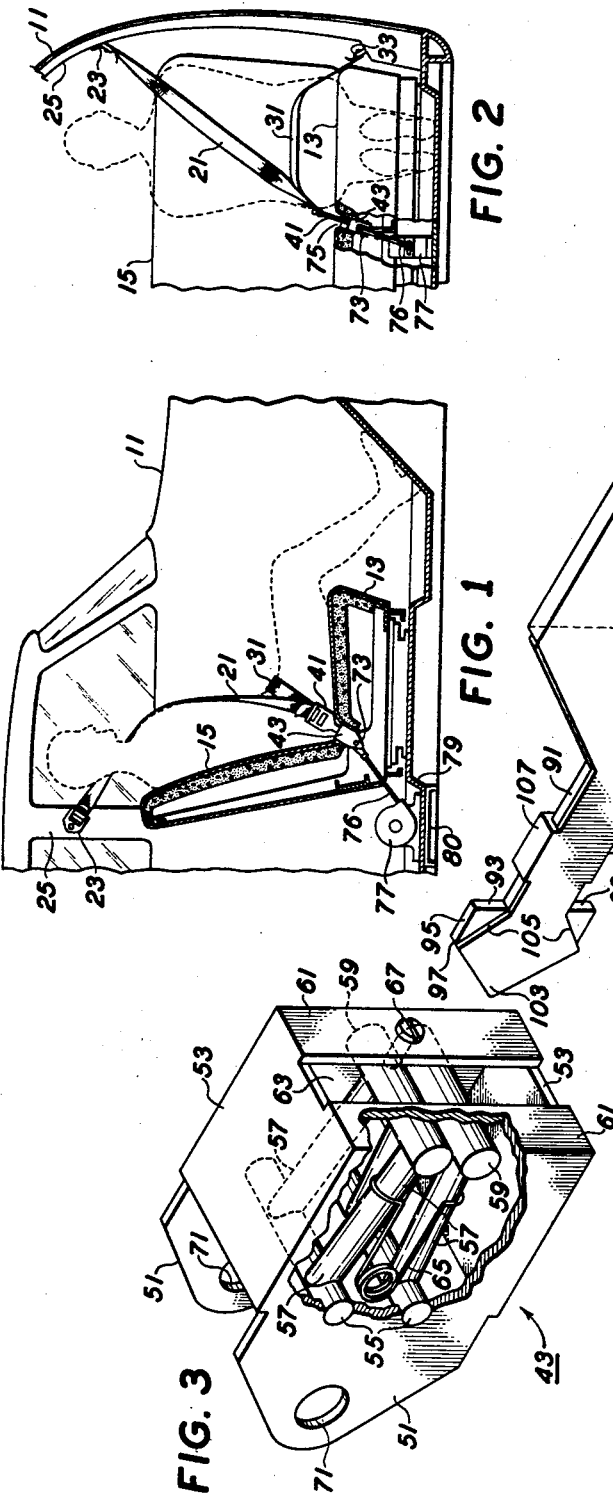
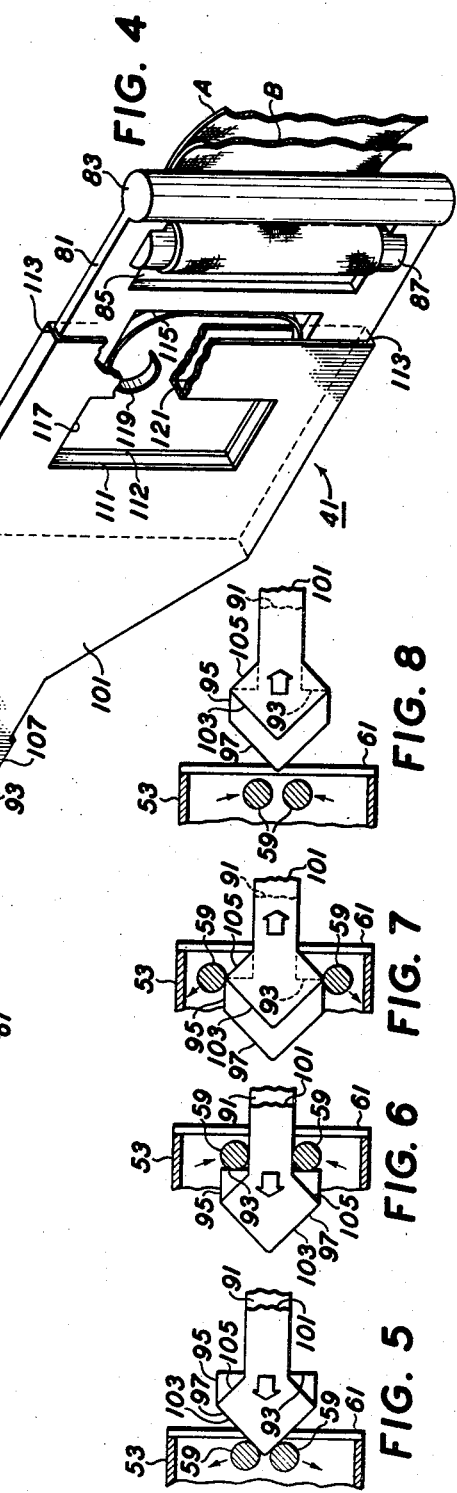

United States Patent Office

3,494,664
Patented Feb. 10, 1970

3,494,664
LATCH FOR SAFETY BELTS
John D. States, 109 Clover Hills Drive,
Rochester, N.Y. 14618
Filed Mar. 8, 1968, Ser. No. 711,640
Int. Cl. A62b *35/00;* A44b *19/00*
U.S. Cl. 297—389                                    6 Claims

ABSTRACT OF THE DISCLOSURE

A latch or anchoring mechanism for an automobile safety belt comprises an anchoring structure located in the crease between the seat portion and back portion of a bench type seat, and a buckle portion fastened to the belt webbing and detachably connectable to the anchoring structure. The anchoring structure includes two bail members parallel to and spring pressed toward each other, but capable of moving laterally away from each other. The buckle portion has a main member with a pointed end and with square shoulders behind the pointed end. When the pointed end is pushed into the anchoring structure, it cams the bail members apart, and they snap behind the square shoulders on the main member, securing it against removal. A release slide on the main member has a cam portion which separates the anchoring bail members from each other when the release slide is moved longitudinally relative to the main member of the buckle portion, thus releasing the bail members from the square shoulders of the buckle portion and allowing the buckle portion to be withdrawn from the anchoring structure.

BACKGROUND OF THE INVENTION

Automobile safety belts, while valuable in preventing or minimizing injuries, are frequently not used because the driver or passenger does not wish to go to even the small amount of trouble required to fasten the belt in place at the beginning of a ride, or unfasten it at the end of the ride. Anything that will make the fastening and unfastening easier and quicker, even to a slight degree, may result in increased use of safety belts, with consequent increase in the safety of the driver and passengers.

The problem is particularly serious with safety belts for seats of the bench type, that is, a seat portion going all the way across the width of the vehicle, with a separate back portion which may be continuous across the width of the vehicle or may be in separate sections, and may be rigid or hinged. Regardless of which style of back portion is used, there is a crease between the seat portion and the back portion. If it is desired to provide a belt of the three point type, with one end fastened to the side wall of the vehicle body at about shoulder height and coming down diagonally across the chest of the wearer, and another end fastened to the floor of the vehicle on the same side of the vehicle body, so that a portion of the belt extends across the lap of the wearer from the floor fastening to what may be called the inboard side of the person, then the third point, where the diagonal chest strap joins the lap strap, is the point which is to be detachably fastened and unfastened. With seats of the bucket type, where separate seats are used for two persons sitting side by side, there is a gap between the seats and the fastening mechanism can be placed in this gap. But with seats of the bench type, there is no such gap, and the fastening mechanism for the third point of the belt must be placed in the crease between the seat and the back, and the connecting or anchoring means must be at the same time both readily accessible for engagement and disengagement, and located in a position where it will not be injurious or uncomfortable to a person accidentally sitting on it.

This has proven to be difficult. With the fastening means of the prior art, the anchoring part has usually projected up above the level of the seat, in order to be accessible for engagement and disengagement with the belt buckle portion. The exposed anchoring portion has been uncomfortable and sometimes even injurious to a person accidentally sitting on it while getting into or out of the seat. On the other hand, if the anchoring portions has been recessed into the seat so that it does not project above the top surface of the seat, then it has been too difficult to make the connection between the anchoring portion and the buckle portion rapidly. It has frequently been necessary to use two hands to make the connection or to disconnect, and frequently also it has been necessary to give careful visual attention to the operation. The operation has been so difficult and fussy that frequently persons have not taken advantage of the seat belts provided for their safety.

The present invention aims to overcome this, and to provide a connection that may be quickly and easily fastened and unfastened by one hand and without any particular visual attention, especially after a little practice. Thus the anchoring structure part of the present invention may be recessed into the seat, where it will not be uncomfortable or injurious to a person sliding across the seat or sitting down in the location where the anchoring structure is located. The buckle or latch portion connected to the seat belt can be easily and quickly inserted in the recessed anchoring structure or removed therefrom, with one hand, notwithstanding the recessed mounting of the anchoring structure. Moreover, the recessing of the anchoring structure into a cavity in the seat serves the further and very important function of keeping the lap portion of the belt quite low, in the region of the person's hip joint, so that the belt will not ride up onto the soft parts of the abdomen, where it may (in case of accident) produce serious or fatal injury to the liver, spleen, kidneys, or bladder.

BRIEF DESCRIPTION OF THE DRAWINGS

In the accompanying drawings, incorporated herein by reference and constituting a material part of the disclosure:

FIG. 1 is a fragmentary vertical section taken longitudinally approximately along the center line of a portion of an automobile, with a preferred embodiment of the present invention applied thereto;

FIG. 2 is a fragmentary vertical section taken transversely through the automobile, illustrating additional details;

FIG. 3 is a perspective view of an anchor unit according to a preferred embodiment of the invention;

FIG. 4 is a perspective view of the latch or buckle unit, in position about to be inserted in the anchor unit;

FIG. 5 is a diagram illustrating the beginning of the insertion of the latch unit into the anchor unit;

FIG. 6 is a similar view of the parts at the completion of the insertion, with the latch unit firmly latched in the anchor unit;

FIG. 7 is a similar view illustrating the release slide of the latch unit operated to release the latch unit from the anchor unit, and with the latch unit beginning to be withdrawn from the anchor unit; and FIG. 8 is a similar diagram showing the latch unit completely withdrawn from the anchor unit.

DESCRIPTION OF THE PREFERRED EMBODIMENT

The present invention provides a seat belt fixture or unit (sometimes called a buckle) adapted to be detachably latched to an anchor unit or assembly. The engagement and disengagement of the cooperating parts can be readily accomplished easily and quickly by one hand, without the need for close visual observation either in latching or unlatching the parts, and after a little practice requiring no visual observation at all. This latching arrangement is particularly useful for detachably anchoring the third point of a three-point seat belt assembly; that is, a seat belt assembly involving a diagonal chest strap, a lap strap, and a connection between the lower end of the diagonal chest strap and the adjacent end of the lap strap, this junction being at the "inboard" side of the person and being considered the third point of the system, whereas the opposite ends of the two straps are at the "outboard" side of the person and are considered as the first and second points and are attached more or less permanently to the vehicle body. However, it is apparent that although this is the preferred use of the connecting arrangement of the present invention, it is not the only possible use, and the present detachable connection structure is also useful for detachably anchoring one end of a chest strap or belt alone, or of a lap strap or belt alone.

Referring now to FIGS. 1 and 2, a fragment of a typical passenger automobile body is shown somewhat schematically at 11. In the body is a seat of the so-called bench type; that is, one which extends across the width of the vehicle and is adjustable forwardly or backwardly as a unit, rather than two separate seats individually adjustable forwardly and readwardly, often called bucket seats. The seat portion of the seat structure is shown at 13, and the back portion at 15, these two portions having the usual crease or angle between them.

Discussing for the moment the seat belt arrangement for the person in the left side or driver's side of the front seat (the arrangement for the person in the right hand front seat would be a reverse duplicate or mirror image thereof) there is a chest strap or belt 21, extending diagonally over the chest of the driver and having its upper end anchored by the buckel 23 to a post 25 of the vehicle body, at approximately shoulder height. The lap strap or lap belt 31 is anchored at its left end by a buckle 33 to a fixed part of the car, at or near the floor. The right ends of the two belts 21 and 31 are brought together to a common point and connected in any suitable manner to a buckle unit or fixture indicated in general at 41, and shown in greater detail in FIG. 4. This unit 41 is detachably latched to an anchor unit or assembly indicated in general at 43 in FIGS. 1 and 2, and shown in greater detail in FIG. 3. The construction of these parts 41 and 43 constitutes an important feature of the present invention. The straps or belts 21 and 31 may be formed from a single continuous piece of webbing, going from the first anchor point 23 to the "third point" member 41 and thence to the second anchor point 33, or they may be formed as separate pieces of belting or webbing, this being immaterial so far as the present invention is concerned.

Taking up next the construction of the anchor unit or assembly 43, and referring especially to FIG. 3, this unit comprises a hollow metal box of strong construction, having two parallel plates 51 constituting the side walls, and top and bottom plates 53 rigidly connecting the side walls 51 to each other. Two short shafts 55 extend across from one side wall 51 to the other, and are rotatable in openings in the side walls. From each of these shafts 55, two strong metal arms 57 extend forwardly, one near each side of and within the box-like structure. The forward ends of the two arms 57 constituting one pair (connected to the same shaft 55) carry a cross piece 59, preferably cylindrical, rigidly connected to the arms and lying close behind a partial front wall of the box, constituted by laterally spaced wall portions 61 having a wide slot 63 between them.

Thus there are two cross bars 59, parallel to each other and to their respective shafts 55, and these bars 59 constitute, in effect, bails swingable on the axes of their respective shafts. A spring 65 of any convenient type (preferably but not necessarily a spring of the hairpin type) pulls the arm 57 on one shaft 55 toward the corresponding arm 57 on the other shaft 55, thus tending to close the bail members 59 toward each other, but complete closure is prevented by suitable stop members, such as a pair of studs 67 screwed into the front wall portions 61 and extending rearwardly into the path of travel of the bail portions 59 to prevent them from being closed tight against each other by the action of the spring 65. One of these studs 67 is mounted in each of the partial front wall portions 61, and only one is seen in FIG. 3, since the front wall portion containing the other is broken away for the sake of showing the interior construction. Due to the separation caused by the studs 67, plus the fact that the bails 59 are of circular cross section, there is always a sufficient entrance gap between the two bails 59 so that any article of moderate size thrust into the slot 63 in the front wall of the anchor unit, approximately at the center thereof, can enter the gap between the two bails 59 and force them apart.

At the rear ends of the side walls 51 of the anchor unit, there are openings 71 through which a bolt or rod 73 (FIGS. 1 and 2) may pass, to attach this anchor unit to any suitable part of the vehicle, in a sturdy manner. A recess 75 is provided in the seat portion 13 near the rear edge thereof, just in front of the back portion 15, and the anchor unit 43 is set into this recess so that it does not project above the top surface of the seat portion 13, and thus does not form an obstruction interfering with a person sliding across the seat from one side of the automobile to the other, nor does it furnish a projection which can be uncomfortable or injurious to a person accidentally sitting down hard on top of the anchor portion 43. This is an important feature of the present invention, the parts being so arranged and designed (as further mentioned below) that they can be engaged and disengaged without requiring any close visual inspection, thereby permitting the anchor unit to be recessed into the seat in a safe manner, in a position where it would be hard to give it close visual attention if visual attention were necessary in either connecting or disconnecting the detachable parts, and in a position tending to keep the lap belt down on the person's lap and prevent it from riding up onto the abdomen.

The mechanism for holding the anchor unit 43 in place in its recess 75 may be of any desired form, the details of which are immaterial for purposes of the present invention, so long as the anchor unit is held sufficiently firmly to withstand the strain caused by severe impact and rapid deceleration of the automobile. For example, the bolt 73 going through the holes 71 of the anchor unit may be connected to a part of the seat structure itself, if the seat structure has been sufficiently reinforced and if it is connected in a sufficiently sturdy manner to the track or runway on which the seat is adjustable forwardly and backwardly, and if the track or runway itself is sufficiently strong. In many cases, it may be desirable to connect the bolt 73 to a cable 76 running to an inertia-type payout and take-up reel 77 firmly anchored to the automobile floor 79 at a place where the floor is sufficiently reinforced as at 80. An inertia take-up reel is known in the art, and is spring loaded so that the cable 76 is taken up by the reel when it is slackened, as for example when the seat 13 is adjusted rearwardly, and the cable is free to be pulled out of the reel slowly, as for example when the seat 13 is adjusted forwardly. But the reel locks and prevents the cable from being payed out if there is a sudden severe pull on the cable, as would occur in the case of an automobile accident.

Turning now to the description of what may be called the buckle unit or latch unit indicated in general at 41, this is best seen in FIG. 4. It comprises a main member of strong and heavy metal, mainly in the form of a flat plate 81 with various apertures and with a particular peripheral configuration, as further mentioned below. At one end, which may be called the strap or belt end of the latch member, there is an enlargement 83 of approximately cylindrical shape, and inwardly from this an opening 85 in which a cylindrical snubbing member 87 is mounted for sliding movement toward and away from the enlargement 83. The member 87 is notched at its ends, to embrace loosely the thickness of the plate 81, to permit sliding movement. If a strap portion A extends down one side of the fixed member 83, around the movable snubbing member 87, and then back at B between the snubbing member 87 and the fixed member 83, it is seen that a pull on the portion A of the belt or webbing will pull the snubbing member 87 tightly up against the member 83 (with the two thicknesses of webbing A and B between them, of course) and thus hold the belt tightly against longitudinal movement. If the pull is on the portion B of the belt rather than on the portion A, however, the belt will pull easily through this buckle. It also can be pulled in the opposite direction (that is, a pull on the portion A) if the exposed ends of the snubbing member 87 are grasped between the thumb and the forefinger and are slid along the opening 85 in a direction away from the member 83. The belt portions A and B in FIG. 4 may represent the end portion of the chest strap 21, or of the lap strap 31, or may represent portions of a continuous length of webbing which forms both the belt portions 21 and 31.

At the opposite end of the plate 81, the plate is considerably reduced in width to form a relatively narrow shank portion 91 which, near its extremity, is laterally enlarged to form square shoulders 93 projecting laterally from the shank 91, at right angles to the longitudinal axis of the plate 81. Beyond these shoulders 93, the plate continues at the same width for a short distance as at 95, and then the lateral edges converge at 97 to form a point or tapered portion. The shoulders 93, portion 95, and tapered end 97 are something like an arrowhead. They are of appropriate size to enter the space between the two bail members 59 of the anchor unit, and force these bail members apart against the tension of their spring 65. Then when the plate 81 has been inserted far enough into the anchor unit, the bail members 59 will snap toward each other under the influence of the spring 65, and will engage behind the square shoulders 93 of the latch member 81, preventing the latch member from being withdrawn from the anchor unit.

For releasing the latch from the anchor unit when desired, there is a release plate slidably mounted on the main plate 81 of the latch assembly. This release plate, indicated in general at 101, is a plate preferably of metal, which need not be so strong as the main plate 81 and therefore can be made of thinner metal. The main portion of the plate lies against one surface of the plate 81, and it has a wide portion corresponding to the wide portion of the main plate 81, and also a narrow portion corresponding to the shank portion 91 of the main plate. The extremity 103 of the slide plate is tapered or pointed at the same angle as the pointed portion 97 of the main plate. But behind this pointed end, instead of having square shoulders like the shoulders 93 of the main plate, the slide plate has sloping shoulders or cam portions 105.

The slide plate 101 is held slidably against the surface of the main plate 81 in any suitable manner. For example, the narrow shank portion of the slide plate may have ears 107 bent over the edges of the shank portion 91 of the main plate and partially engaging the opposite side surface of the main plate, in a loosely slidable manner. The wider portion of the slide plate 101 (corresponding to the full width portion of the main plate 81) likewise may have ears bent over and loosely embracing the edges of the main plate, or preferably, is extended over the full width of the main plate, so that the slide has, at this point, one wall portion 111 engaging slidably with one surface of the main plate 81, and a second wall portion 112 engaging slidably with the opposite surface of the main plate 81, and of course connecting portions 113 to connect the portion 111 to the portion 112, around the edges of the main plate.

A fairly large opening 115 is formed through the main plate 81 approximately centrally in the wide portion thereof, and openings 117, but of somewhat smaller area, are formed in the opposite side plates 111 and 112 of the slide. The openings 117 are preferably of the same width as the opening 115, in a direction across the width of the main plate 81, but are somewhat shorter than the opening 115 in a direction along the longitudinal axis of the plate 81. However, the openings 117 are sufficiently large so that two or three fingers of a person's hand may be inserted through the openings, preferably even when wearing gloves.

The parts are so proportioned that when the slide 101 is in a position where the pointed end 103 is flush with the pointed end 97 of the main plate, the forward edges of the openings 117 are even with or flush with the forward edge of the opening 115, but the rear edges of the openings 117 (that is, the edges closest to the end member 93 of the latch structure) are spaced substantially forwardly from the rear edge of the opening 115, the latter opening being substantially longer. In this space between the rear edge of the opening 115 and the rear edge of the openings 117, is any suitable spring such as the curved leaf spring 119, which reacts against the rear edge of the opening 115 and pushes forwardly against a wall 121 which joins the two side wall portions 111 and 112 of the slide to each other along the rear edge of the openings 117. Thus the spring 119 constantly tends to move the slide longitudinally relative to the main plate 81, in a direction toward the pointed end 97 of the main plate. Any suitable stop means of conventional form (not shown) is provided to limit the extent of such movement to a position where the pointed ends of the main plate and the slide are flush with each other.

FIGS. 3 and 4 taken together constitute, in effect, a single exploded view of the buckle or latch unit and the anchor unit in alined position relative to each other, with the latch unit ready to be thrust into the anchor unit and locked therein. It may be noted that the slot 63 in the anchor unit is substantially wider than the combined thickness of the plates 81 and 101, but of less width than the shank 91, so that it is impossible for the latch or buckle unit to turn 90 degrees on its longitudinal axis and become accidentally disengaged from the anchor unit.

The operation of the latch structure is engaging it with and disengaging it from the anchoring unit will be clear from what has been said above, but may be briefly summarized by reference to the diagrams constituting FIGS. 5–8. Since the two bail members 59 of the anchoring structure are rounded to make entrance between them easy, and since they are already partly separated by the stop members 67, making entrance between them even easier, it is very simple and easy to thrust the pointed end of the latch structure into the slot 63 of the anchoring structure, between the members 59, in the manner illustrated in FIG. 5. The pointed ends 97 and 103 will serve to cam the members 59 apart, in the direction of the small arrows in FIG. 5, against the force of their spring 65. In other words, the inclined surfaces 97 and 103 act as wedges, separating the members 59.

As the entrance motion continues, the portions 95 pass beyond the members 59, and the spring 65 snaps the members 59 together, toward each other, behind the square shoulders 93, in the direction of the small arrows in FIG. 6, so that the parts now assume the respective positions shown in FIG. 6 and the member 81 is securely latched in the anchoring structure and cannot be withdrawn. The entrance motion, to achieve the position shown in FIG. 6, is extremely easy, and after a very small amount of practice it does not need any visual observation, but can be done almost automatically by the person in the automobile, who soon learns to coordinate the motion of his hand carrying the latch member with the position of the anchoring structure recessed in the seat, without even looking at it and while he is still looking forward through the windshield of the vehicle, if desired.

When the person wishes to release the seat belt, he puts his hand down at his side and puts two or three fingers through the opening 117 of the slide member, and simply pulls obliquely upwardly in a direction away from the anchor unit. The upward pull causes the slide member to slide longitudinally along the main plate 81, against the force of the light spring 119, so that the inclined cam edges 105 of the slide will engage the bail members 59 as apparent in FIG. 7 and cam the bail members laterally away from each other, against the force of the spring 65, in the direction of the small arrows in FIG. 7. Thus the retaining members 59 are separated laterally from each other, sufficiently to clear the square shoulders 93 with which they are previously engaged. When they reach the position illustrated in FIG. 7, the entire end of the latch member (the "arrowhead" portion) can be completely withdrawn from the anchor unit, to the position shown in FIG. 8, and the spring 65 will now cause the members 59 to come together again in the direction of the small arrows in FIG. 8, to the initial position determined by the stop members 67. The latch structure is now completely freed from the anchor structure, thus releasing this end of the seat belt or belts. The parts are now ready for being latched again whenever desired.

It is to be understood that the disclosure is given by way of illustrative example only, rather than by way of limitation.

What is claimed is:

1. An automobile seat belt securing structure comprising an anchor unit having two retaining members having portions extending parallel to each other, at least one of which is movable toward and away from the other, and spring means tending to move one of said retaining members toward the other, and a buckle unit having a main portion and a seat belt attached thereto, said main portion comprising a first substantially flat plate having a pointed end adapted to be thrust between said portions of said retaining members to move them away from each other and having at least one shoulder adapted to engage behind one of said retaining member portions to prevent withdrawal of said main portion of said buckle unit from said anchor unit, a cam member comprising a second plate slidable on said first plate for engaging at least one of said retaining members to separate said portions of said retaining members from each other so as to release said shoulder and permit withdrawal of said buckle unit from said anchor unit, and a spring tending to move said second plate relative to said first plate to a position ineffective to release said shoulder from said retaining members.

2. A construction as defined in claim 1, wherein said main portion of said buckle unit has a shank portion with an enlarged head tapered at its forward end for insertion between said portions of said retaining members to wedge them apart and square shoulders at its rear end to make locking engagement with said portions of said retaining members.

3. A construction as defined in claim 2, wherein said cam member also has a shank portion with an enlarged head tapered at its forward end and also tapered at its rear end to form inclined cam portions engaging said portions of said retaining members to cam them apart when said head of said cam member is moved to a predetermined release position relative to said head of said main portion while said shank of said main portion is engaged between said retaining members.

4. A construction as defined in claim 3, wherein said anchor unit has walls partially enclosing said retaining members, said walls having a gap through which said shanks and enlarged heads of said buckle unit may be inserted into cooperative relation to said retaining members, said gap having a width less than the width of said shank portions so that said buckle unit cannot be turned sideways after being inserted into said gap.

5. A construction as defined in claim 4, wherein each of said retaining members includes a shaft rotatable in said walls of said anchor unit, and wherein said portions of said retaining members are bail portions connected to and swinging with their respective shafts.

6. A vehicular seat belt securing structure comprising an anchor unit having two arms each pivoted at one end and having at its free end a retaining portion swingable toward and away from the retaining portion of the other arm, spring means tending to swing both arms toward each other to narrow the space between their respective retaining portions, and a belt attaching unit having a plate to which a seat belt may be secured, said plate having an opening therethrough of sufficient size to receive fingers of a person and having forwardly of such opening a shank with an enlarged head tapered in a forward direction so as to separate said retaining portions of said arms from each other when thrust forwardly between them, said head having square shoulders faced rearwardly to engage and be held by said retaining portions of said arms when said head has been thrust forwardly between said retaining portions, said belt attaching unit also having a cam member slidable on said plate, said cam member also having an opening therethrough of sufficient size to receive fingers of a person and having forwardly of such opening a shank with an enlarged head tapered both forwardly and rearwardly so as to separate said retaining portions of said arms from each other when moved either forwardly or rearwardly between them, and spring means tending to move said cam member forwardly relative to said plate to a position in which the forwardly tapered portion of the head of said cam member has substantially the same outline as the forwardly tapered portion of the head of said plate and the rearwardly tapered portion of the head of said cam member is within the outline of said square shoulders of said plate and therefore ineffective to separate said retaining portions from each other when said plate is pulled in a direction away from said anchor unit, said finger openings in said plate and said cam member being partly alined with each other and having the rear edge of the finger opening in the cam member offset forwardly from the rear edge of the finger opening in the plate, so that when fingers are inserted through the two openings and pulled rearwardly, they will move said cam member rearwardly relative to said plate, against the force of said last mentioned spring means, to a position wherein the rearwardly tapered portion of the head of said cam member projects beyond the outline of said square shoulders to swing said retaining portions of said arms away from each other sufficiently to release said square shoulders therefrom, so that said plate may be removed from said anchor unit.

References Cited

UNITED STATES PATENTS

| | | | |
|---|---|---|---|
| 2,153,077 | 4/1939 | Clarke | 24—230.1 |
| 2,708,555 | 5/1955 | Heinemann et al. | 297—388 X |
| 2,855,028 | 10/1958 | Matthews | 297—385 |
| 2,951,274 | 9/1960 | Elsner | 24—330.1 |
| 3,109,677 | 11/1963 | Hoover | 24—211 X |
| 3,258,293 | 6/1966 | Sharp | 297—389 |
| 3,317,243 | 5/1967 | Weman | 297—389 |
| 3,404,439 | 10/1968 | Jones et al. | 24—230.1 |

JAMES T. McCALL, Primary Examiner

U.S. Cl. X.R.

24—211, 230; 297—385